US011687635B2

(12) United States Patent
Kowdle et al.

(10) Patent No.: US 11,687,635 B2
(45) Date of Patent: Jun. 27, 2023

(54) AUTOMATIC EXPOSURE AND GAIN CONTROL FOR FACE AUTHENTICATION

(71) Applicant: Google LLC, Mountain View, CA (US)

(72) Inventors: Adarsh Prakash Murthy Kowdle, San Francisco, CA (US); Ruben Manuel Velarde, Chula Vista, CA (US); Zhijun He, Mountain View, CA (US); Xu Han, Mountain View, CA (US); Kourosh Derakshan, Mountain View, CA (US); Shahram Izadi, Tiburon, CA (US)

(73) Assignee: Google PLLC, Mountain View, CA (US)

( * ) Notice: Subject to any disclaimer, the term of this patent is extended or adjusted under 35 U.S.C. 154(b) by 0 days.

(21) Appl. No.: 17/439,762

(22) PCT Filed: Sep. 25, 2019

(86) PCT No.: PCT/US2019/052860
§ 371 (c)(1),
(2) Date: Sep. 15, 2021

(87) PCT Pub. No.: WO2021/061112
PCT Pub. Date: Apr. 1, 2021

(65) Prior Publication Data
US 2022/0191374 A1 Jun. 16, 2022

(51) Int. Cl.
*G06F 21/32* (2013.01)
*H04N 5/33* (2023.01)
(Continued)

(52) U.S. Cl.
CPC ............ *G06F 21/32* (2013.01); *G06V 10/143* (2022.01); *G06V 10/235* (2022.01);
(Continued)

(58) Field of Classification Search
None
See application file for complete search history.

(56) References Cited

U.S. PATENT DOCUMENTS 7,099,056 B1    8/2006   Kindt
7,542,628 B2    6/2009   Lolacono et al.
(Continued)

FOREIGN PATENT DOCUMENTS

CN    101202841    6/2008
CN    103702015    4/2014
(Continued)

OTHER PUBLICATIONS

"International Preliminary Report on Patentability", Application No. PCT/US2019/050245, dated Mar. 9, 2022, 10 pages.
(Continued)

*Primary Examiner* — James M Hannett
(74) *Attorney, Agent, or Firm* — Colby Nipper PLLC

(57) ABSTRACT

This document describes techniques and systems that enable automatic exposure and gain control for face authentication. The techniques and systems include a user device initializing a gain for a near-infrared camera system using a default gain. The user device ascertains patch-mean statistics of one or more regions-of-interest of a most-recently captured image that was captured by the near-infrared camera system. The user device computes an update in the initialized gain to provide an updated gain that is usable to scale the one or more regions-of-interest toward a target mean-luminance value. The user device dampens the updated gain by using hysteresis. Then, the user device sets the initialized gain for the near-infrared camera system to the dampened updated gain.

20 Claims, 10 Drawing Sheets

(51) Int. Cl.
    *H04N 23/72* (2023.01)
    *H04N 23/71* (2023.01)
    *G06V 10/22* (2022.01)
    *G06V 10/143* (2022.01)
    *G06V 40/16* (2022.01)

(52) U.S. Cl.
    CPC ............. *G06V 40/166* (2022.01); *H04N 5/33* (2013.01); *H04N 23/71* (2023.01); *H04N 23/72* (2023.01)

(56) References Cited

U.S. PATENT DOCUMENTS

| | | |
|---|---|---|
| 8,483,479 B2 | 7/2013 | Kunkel et al. |
| 8,798,378 B1 | 8/2014 | Babenko et al. |
| 8,890,975 B2 | 11/2014 | Baba et al. |
| 8,982,238 B2 | 3/2015 | Liu et al. |
| 9,253,412 B2 | 2/2016 | Lee |
| 9,286,509 B1 * | 3/2016 | Rodriguez ........... H04N 5/2351 |
| 9,491,452 B2 | 11/2016 | Meloun et al. |
| 9,609,197 B1 | 3/2017 | Stepanenko |
| 9,619,633 B1 | 4/2017 | Mortensen |
| 9,686,475 B2 | 6/2017 | Neglur |
| 9,774,798 B1 | 9/2017 | Evans, V et al. |
| 10,015,408 B2 | 7/2018 | Shabtay et al. |
| 10,521,952 B2 | 12/2019 | Ackerson et al. |
| 11,257,226 B1 | 2/2022 | Soth et al. |
| 11,352,812 B2 | 6/2022 | Johnson |
| 2003/0068100 A1 | 4/2003 | Covell et al. |
| 2003/0103652 A1 | 6/2003 | Lee et al. |
| 2005/0099494 A1 | 5/2005 | Deng et al. |
| 2005/0265626 A1 | 12/2005 | Endo et al. |
| 2006/0104488 A1 | 5/2006 | Bazakos et al. |
| 2007/0025714 A1 | 2/2007 | Shiraki |
| 2007/0052839 A1 | 3/2007 | Kong et al. |
| 2007/0216777 A1 | 9/2007 | Quan et al. |
| 2009/0207266 A1 | 8/2009 | Yoda |
| 2009/0303343 A1 | 12/2009 | Drimbarean et al. |
| 2010/0048242 A1 | 2/2010 | Rhoads et al. |
| 2011/0034176 A1 | 2/2011 | Lord et al. |
| 2011/0090303 A1 | 4/2011 | Wu et al. |
| 2011/0143811 A1 | 6/2011 | Rodriquez |
| 2011/0212717 A1 | 9/2011 | Rhoads et al. |
| 2011/0261217 A1 | 10/2011 | Muukki et al. |
| 2012/0002074 A1 | 1/2012 | Baba et al. |
| 2012/0050570 A1 | 3/2012 | Jasinski et al. |
| 2012/0051635 A1 | 3/2012 | Kunkel et al. |
| 2012/0154579 A1 | 6/2012 | Hampapur et al. |
| 2012/0162478 A1 | 6/2012 | Lee |
| 2013/0147923 A1 | 6/2013 | Zhou et al. |
| 2013/0177203 A1 | 7/2013 | Koo et al. |
| 2013/0242129 A1 | 9/2013 | Harmelling et al. |
| 2013/0342731 A1 | 12/2013 | Lee et al. |
| 2014/0009639 A1 | 1/2014 | Lee |
| 2014/0080428 A1 | 3/2014 | Rhoads et al. |
| 2015/0156388 A1 | 6/2015 | Neglur |
| 2015/0348580 A1 | 12/2015 | Van Hoff et al. |
| 2016/0112637 A1 | 4/2016 | Laroia et al. |
| 2016/0163029 A1 | 6/2016 | Gibbon et al. |
| 2016/0234023 A1 | 8/2016 | Mozer et al. |
| 2016/0248979 A1 | 8/2016 | Israel et al. |
| 2016/0283789 A1 | 9/2016 | Slaby et al. |
| 2016/0309065 A1 | 10/2016 | Karafin et al. |
| 2016/0337570 A1 | 11/2016 | Tan et al. |
| 2017/0053167 A1 | 2/2017 | Ren et al. |
| 2017/0116932 A1 | 4/2017 | Musgrave et al. |
| 2017/0213112 A1 | 7/2017 | Sachs et al. |
| 2017/0351932 A1 | 12/2017 | Uliyar et al. |
| 2018/0181737 A1 | 6/2018 | Tussy |
| 2018/0249142 A1 | 8/2018 | Hicks et al. |
| 2018/0336399 A1 | 11/2018 | Gernoth et al. |
| 2018/0367681 A1 | 12/2018 | Xu et al. |
| 2019/0042835 A1 | 2/2019 | Mostafa et al. |
| 2019/0130166 A1 | 5/2019 | Wang |
| 2019/0130630 A1 | 5/2019 | Ackerson et al. |
| 2019/0138793 A1 | 5/2019 | Rodriguez |
| 2019/0171908 A1 | 6/2019 | Salavon |
| 2019/0259360 A1 | 8/2019 | Yoelin |
| 2020/0053262 A1 | 2/2020 | Wexler et al. |
| 2020/0105291 A1 | 4/2020 | Sheaffer et al. |
| 2020/0128203 A1 * | 4/2020 | Hirono ................... H04N 5/369 |
| 2020/0151964 A1 | 5/2020 | Chen et al. |
| 2020/0184278 A1 | 6/2020 | Zadeh et al. |
| 2020/0225673 A1 | 7/2020 | Ebrahimi et al. |
| 2020/0236466 A1 | 7/2020 | Zhao et al. |
| 2020/0320297 A1 | 10/2020 | Ahn et al. |
| 2020/0349249 A1 | 11/2020 | Weston |
| 2020/0349345 A1 | 11/2020 | Hodge et al. |
| 2020/0349376 A1 | 11/2020 | Raveendran |
| 2021/0001862 A1 | 1/2021 | Senechal et al. |
| 2021/0248782 A1 | 8/2021 | Chang et al. |
| 2022/0100831 A1 | 3/2022 | Moreno et al. |
| 2022/0121884 A1 | 4/2022 | Zadeh et al. |
| 2022/0172511 A1 | 6/2022 | He et al. |
| 2022/0319219 A1 | 10/2022 | Tsibulevskiy et al. |
| 2022/0382840 A1 | 12/2022 | Weston et al. |

FOREIGN PATENT DOCUMENTS

| | | |
|---|---|---|
| CN | 106446873 | 2/2017 |
| CN | 107302663 | 10/2017 |
| CN | 107734129 | 2/2018 |
| CN | 108780477 | 11/2018 |
| CN | 109145653 | 1/2019 |
| CN | 109325327 | 2/2019 |
| CN | 111738230 | 10/2020 |
| JP | 2013152643 | 8/2013 |
| WO | 2005096213 | 10/2005 |
| WO | 2018005073 | 1/2018 |
| WO | 2018188535 | 10/2018 |
| WO | 2018198690 | 11/2018 |
| WO | 2019027503 | 2/2019 |
| WO | 2021050042 | 3/2021 |
| WO | 2021061112 | 4/2021 |
| WO | 2021066839 | 4/2021 |
| WO | 2021071497 | 4/2021 |

OTHER PUBLICATIONS

"International Preliminary Report on Patentability", Application No. PCT/US2019/052860, dated Mar. 15, 2022, 19 pages.
"International Preliminary Report on Patentability", Application No. PCT/US2019/054712, dated Apr. 5, 2022, 10 pages.
"Preliminary Report on Patentability", Application No. PCT/US2019/055669, dated Apr. 12, 2022, 13 pages.
"Reinforcement Learning—Wikipedia", Retrieved from: https://en.wikipedia.org/wiki/Reinforcement_learning—on May 11, 2022, 16 pages.
Gordon, "How to Use HDR Mode When Taking Photos", Dec. 17, 2020, 13 pages.
Hasinoff, et al., "Burst photography for high dynamic range and low-light imaging on mobile cameras", Nov. 2016, 12 pages.
Kains, et al., "Astrophotography with Night Sight on Pixel Phones", https://ai.googleblog.com/2019/11/astrophotography-with-night-sight-on.html, Nov. 26, 2019, 8 pages.
"A Review of Multimodal Facial Biometric Authentication Methods in Mobile Devices and their Application in Head Mounted Displays", 2018 IEEE SmartWorld, Ubiquitous Intelligence & Computing, Advanced & Trusted Computing, Scalable Computing & Communications, Cloud & Big Data Computing, Internet of People and Smart City Innovations, 2018, 8 pages.
"AudioCapture-Premium Audio Experience for Your Video Recordings", Retrieved at: https://product.goodix.com/en/product/audioa_capture—on Mar. 8, 2021, 2 pages.
"Foreign Office Action", EP Application No. 19797409.0, dated Jul. 16, 2021, 4 pages.
"International Search Report and Written Opinion", Application No. PCT/US2019/052860, dated Jul. 20, 2020, 27 pages.
"International Search Report and Written Opinion", PCT Application No. PCT/US2019/054712, dated Jan. 10, 2020, 15 pages.

(56) References Cited

OTHER PUBLICATIONS

"International Search Report and Written Opinion", PCT Application No. PCT/US2019/050245, dated May 12, 2020, 42 pages.
"International Search Report and Written Opinion", PCT Application No. PCT/US2019/055669, dated May 28, 2020, 20 pages.
"Invitation to Pay Additional Fees", PCT Application No. PCT/US2019/052860, Jun. 2, 2020, 12 pages.
"Nokia OZO Audio", OZO.Nokia.com—Retrieved on Feb. 10, 2021, 2020, 16 pages.
"Notice of Allowance", U.S. Appl. No. 16/956,730, dated Jul. 9, 2021, 10 pages.
"PL-D Camera Synchronization Methods", Retrieved from the internet at https://support.pixelink.com/support/solutions/articles/3000085024-pl-d-camera-synchronization-methods, Aug. 1, 2019, 9 pages.
Chang, et al., "Low-light Image Restoration with Short-and-long-exposure Raw Pairs", Jul. 1, 2020, 12 pages.
Chang, "Measuring Stereo Camera Alignment Using Depth Map Smoothness", Technical Disclosure Commons; Retrieved from https://www.tdcommons.org/dpubs_series/2580, Oct. 17, 2019, 9 pages.
Chen, "Enhancing Image Quality of Photographs Taken by Portable Devices by Matching Images to High Quality Reference Images Using Machine Learning and Camera Orientation and Other Image Metadata", Technical Disclosure Commons; Retrieved from https://www.tdcommons.org/dpubs_series/2717, Nov. 25, 2019, 14 pages.
Cho, "Motion Blur Removal from Photographs", Massachusetts Institute of Technology, Sep. 2010, 143 pages.
Fried, et al., "Perspective-Aware Manipulation of Portrait Photos", SIGGRAPH '16 Technical Paper, Jul. 24-28, 2016, Anaheim, CA, 10 pages.
Gao, et al., "Camera Sensor Exposure Control During Camera Launch", Nov. 24, 2020, 7 pages.
Gao, et al., "Scene Metering and Exposure Control for Enhancing High Dynamic Range Imaging", Technical Disclosure Commons; Retrieved from https://www.tdcommons.org/dpubs_series/3092, Apr. 1, 2020, 12 pages.
Hahne, "Real-Time Depth Imaging", Retrieved from https://d-nb.info/1023762218/34, May 3, 2012, 108 pages.
Hong, et al., "Image Deblurring According to Facially Recognized Locations Within the Image", Technical Disclosure Commons, https://www.tdcommons.org/dpubs_series/4193, Mar. 26, 2021, 9 pages.
Hong, et al., "Method of Capturing a Video and a Set of Selected High-Quality Images During Camera Shutter Long-Press", Technical Disclosure Commons; Retrieved from https://www.tdcommons.org/dpubs_series/2757, Dec. 12, 2019, 10 pages.
Hong, et al., "Predictive Modeling Techniques for Adaptive Face Retouching", https://www.tdcommons.org/dpubs_series/4208, Apr. 5, 2021, 9 pages.
Jackson, "The Creative and Technical Differences Between Full Frame and S-35", Accessed from: https://vmi.tv/training/useful-stuff/differences-between-full-frame-and-s-35, Feb. 2020, 19 pages.
Jain, et al., "On Detecting GANs and Retouching Based Synthetic Alterations", Jan. 26, 2019, 7 pages.
Khoshelham, et al., "Accuracy and Resolution of Kinect Depth Data for Indoor Mapping Applications", Retrieved from https://www.researchgate.net/publication/221967616_Accuracy_and_Resolution_of_Kinect_Depth_Data_for_Indoor_Mapping_Applications, Feb. 1, 2012, 18 pages.
Li, "Scene-Aware Audio for 360° Videos", May 12, 2018, 12 pages.
Lombardi, et al., "Adaptive User Interface for a Camera Aperture within an Active Display Area", Technical Disclosure Commons; Retrieved from https://www.tdcommons.org/dpubs_series/2719, Nov. 25, 2019, 12 pages.
Moraldo, "Virtual Camera Image Processing", Technical Disclosure Commons; Retrieved from https://www.tdcommons.org/dpubs_series/3072, Mar. 30, 2020, 10 pages.
Mustaniemi, et al., "LSD—Joint Denoising and Deblurring of Short and Long Exposure Images with CNNs", Sep. 1, 2020, 21 pages.
Portmann, et al., "Detection of Automated Facial Beautification by a Camera Application by Comparing a Face to a Rearranged Face", Technical Disclosure Commons, Retrieved from https://www.tdcommons.org/dpubs_series/2943, Feb. 9, 2020, 11 pages.
Shih, et al., "Techniques for Deblurring Faces in Images by Utilizing Multi-Camera Fusion", Technical Disclosure Commons—https://www.tdcommons.org/dpubs_series/4274, May 5, 2021, 9 pages.
Talvala, et al., "Techniques and Apparatuses for Variable-Display Devices to Capture Screen-Fitting Images with a Maximized Field of View", Technical Disclosure Commons; Retrieved from https://www.tdcommons.org/dpubs_series/3388, Jun. 29, 2020, 8 pages.
Tillman, "What is Apple Face ID and How Does it Work?", Retrieved from the internet at https://www.pocket-lint.com/phones/news/apple/142207-what-is-apple-face-id-and-how-does-it-work on May 13, 2020, Sep. 18, 2019, 10 pages.
Xompero, et al., "Multi-camera Matching of Spatio-Temporal Binary Features", 2018 21st International Conference an Information Fusion (Fusion), 2018, 8 pages.
Yang, et al., "Improved Object Detection in an Image by Correcting Regions with Distortion", Technical Disclosure Commons; Retrieved from https://www.tdcommons.org/dpubs_series/3090, Apr. 1, 2020, 8 pages.
Yang, et al., "Object Detection and Tracking with Post-Merge Motion Estimation", Technical Disclosure Commons, https://www.tdcommons.org/dpubs_series_4353, Jun. 8, 2021, 11 pages.
Yang, et al., "Using Image-Processing Settings to Determine an Optimal Operating Point for Object Detection on Imaging Devices", Technical Disclosure Commons; Retrieved from https://www.tdcommons.org/dpubs_series/2985, Mar. 4, 2020, 10 pages.
Yuan, et al., "Image Deblurring with Blurred/Noisy Image Pairs", Jul. 29, 2007, 10 pages.
"Foreign Office Action", CN Application No. 201980093777.8, dated Oct. 19, 2022, 20 pages.
"Foreign Office Action", CN Application No. 201980093736.9, dated Oct. 27, 2022, 20 pages.
"Non-Final Office Action", U.S. Appl. No. 17/437,395, dated May 2, 2023, 16 pages.

\* cited by examiner

AUTOMATIC EXPOSURE AND GAIN CONTROL FOR FACE AUTHENTICATION

CROSS-REFERENCE TO RELATED APPLICATION(S)

This application is a national stage entry of International Application No. PCT/US2019/052860, filed Sep. 25, 2019, the disclosure which is incorporated herein by reference in its entirety.

BACKGROUND

Adaptive exposure control (AEC) and adaptive gain control (AGC) have become a standard part of image signal processors (ISPs) of digital cameras capturing color images. Generally, these color cameras collect image statistics over an entire captured image to guide controls for adjusting sensor settings. This becomes evident when transitioning between different ambient lighting conditions. For example, when moving from a dim room to outdoors under the bright sun, the camera sensor becomes saturated without an adjustment by the AEC and/or AGC. Although an AEC and an AGC tend to be tuned to provide a "good-looking" overall image, these conventional techniques are less efficient for other camera use cases, such as face authentication implementations that operate in the infrared spectrum.

SUMMARY

This document describes techniques and systems that enable automatic exposure and gain control for face authentication. These techniques include a user device using a near-infrared camera system to capture an image of a user for face authentication and automatically adjusting the gain for different ambient lighting conditions to reduce over-saturation or under-saturation of image pixels. The user device implements a gain control module that performs adaptive gain control with a fixed exposure time in the near-infrared camera system for face authentication, using patch-mean statistics (e.g., mean luminance) on one or more regions-of-interest, rather than for the entire image. The regions-of-interest are regions of the image that include a user's face and, in some cases, the user's chest, which can be used to stabilize statistics of the user's face. A default gain is first used to capture an image of the user's face. The gain control module obtains statistics of the regions-of-interest and determines an update in the gain that is usable to scale the statistics of the regions-of-interest toward a target mean. The update is applied to the gain of the near-infrared camera system and the patch-mean statistics computation process is repeated when the near-infrared camera system requests an update in the gain due to over-saturation or under-saturation of the pixels of the user's face in the image.

This summary is provided to introduce simplified concepts concerning automatic exposure and gain control for face authentication, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

The details of one or more aspects of automatic exposure and gain control for face authentication are described in this document with reference to the following drawings. The same numbers are used throughout the drawings to reference like features and components.

DETAILED DESCRIPTION

Overview

Figure 1:
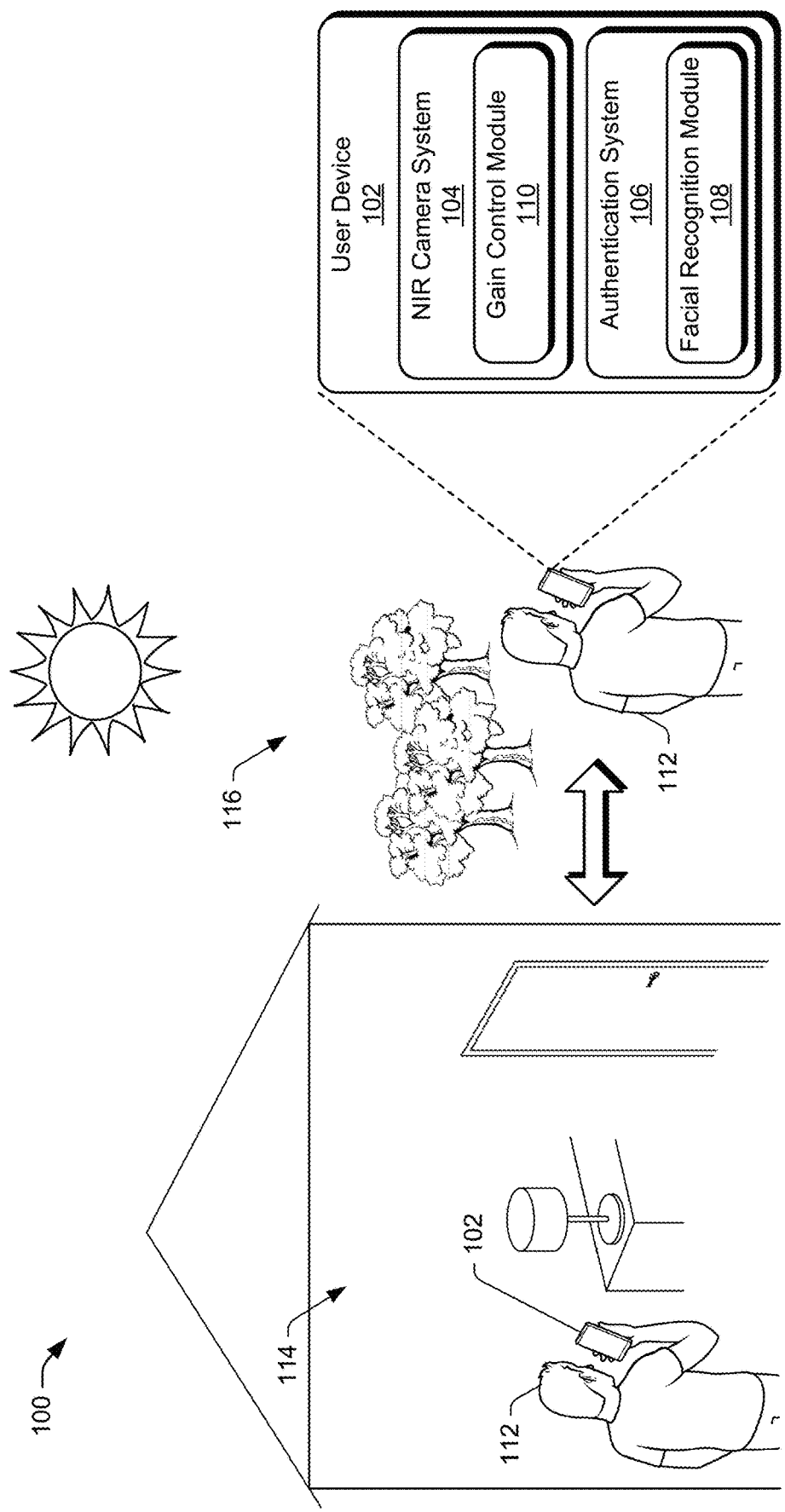
FIG. 1 illustrates an example environment in which techniques for automatic exposure and gain control for face authentication can be implemented.

This document describes techniques and systems that enable automatic exposure and gain control for face authentication. Gain and exposure controls generally used for color cameras for adjusting to different ambient lighting conditions (e.g., indoor, outdoor, bright, dark) are inefficient for face authentication, which operates in the infrared spectrum, specifically, a near-infrared (NIR) spectrum. For example, color cameras (also referred to as Red, Green, Blue (RGB) cameras) generally collect image statistics over an entire image, including background scenery, to guide controls for adjusting camera sensor settings to enable capture of a complete image (e.g., a subject of the image and also background scenery). When the user takes the user device outdoors and attempts to use the RGB camera, the gain and exposure time of the image sensors are decreased. Lowering the gain helps prevent saturation of pixels and decreasing exposure time reduces the amount of light captured by the RGB camera. When the user moves indoors to a darker ambient area, the gain and exposure time of the image sensors are increased to help prevent desaturation of the pixels.

Face authentication, however, is generally concerned with a person's face and not typically concerned with background scenery. Consequently, utilizing the background in a gain or exposure adjustment for face authentication may result in incorrect adjustments to the gain and/or the exposure, thereby prolonging the face authentication process. In addition, by unnecessarily analyzing the background when determining the gain or exposure adjustment, processing power and bandwidth may be unnecessarily consumed.

The techniques and systems described herein provide efficient and accurate controls for automatic exposure and gain control for face authentication. To reduce computations on unnecessary portions of an image for face authentication, the user device focuses on one or more specific regions-of-interest in the image. For example, a bright sun in a corner of the image can affect a gain adjustment for the overall image. However, the user device can disregard the bright sun and focus only on the actual region needed for face authentication, such as a region of the image including the user's face, to ensure that the gain is adjusted to a target setting that allows a high-quality NIR image of the user's face to be captured for face authentication input. The techniques and systems described herein not only cause a user device to focus on one or more regions-of-interest in the image, but may also enable the user device to determine which regions to focus on.

In aspects, a method for adaptive gain control in a near-infrared camera system for face authentication on a user device is disclosed. The method includes, in response to initiation of a camera driver system, initializing a gain for the near-infrared camera system using a default gain. The method also includes ascertaining patch-mean statistics of one or more regions-of-interest of a most-recently captured image that was captured by the near-infrared camera system. In addition, the method includes computing an update for the gain to provide an updated gain that is usable to scale the one or more regions-of-interest toward a target mean-luminance value. Also, the method includes setting the initialized gain for the near-infrared camera system to the updated gain for a next face-authentication attempt.

In aspects, a computing system with adaptive gain control in a near-infrared camera system is described. The computing system includes a near-infrared camera system for capturing image data of a user for face authentication. In addition, the computing system includes a camera driver system configured to drive the near-infrared camera system. The computing system also includes a processor and computer-readable instructions which, when executed by the processor, cause the computing system to perform the method described above.

These are but a few examples of how the described techniques and devices may be used to enable automatic exposure and gain control for face authentication. Other examples and implementations are described throughout this document. The document now turns to an example operating environment, after which example devices, methods, and systems are described.

Operating Environment

FIG. 1 illustrates an example environment 100 in which techniques enabling face authentication embedding migration can be implemented. The example environment 100 includes a user device 102 (e.g., electronic device), which includes, or is associated with, a near-infrared (NIR) camera system 104, and an authentication system 106.

As further described below, the authentication system 106 is configured to implement a facial recognition module 108 and the NIR camera system 104 is configured to implement a gain control module 110. The facial recognition module 108 can configure the NIR camera system 104 to capture NIR image data representing a user's face. Generally, NIR refers to light within a range of wavelengths between approximately 750 nanometers and 2500 nanometers and is invisible to the human eye. The facial recognition module 108 may, for instance, be configured to use a neural network (e.g., convolutional neural network) or other type of machine-learned model, trained using machine-learned techniques, to generate embeddings from the captured NIR image data. The embeddings are n-dimensional vectors representing features of the user's face. The facial recognition module 108 then validates these embeddings by comparing them to previously-stored enrolled embeddings to authenticate a user 112 to unlock the user device 102. If there is a match, then the user 112 is authenticated and the user device is unlocked.

In the illustrated example, the user 112 moves between an indoor area 114 with dim lighting and an outdoor area 116 with bright sunlight. By moving from the darker indoor area 114 to the bright sun in the outdoor area 116, camera sensors of the NIR camera system become saturated. Moving from the outdoor area 116 to the dim light of the indoor area 114 can result in the camera sensors becoming desaturated. Accordingly, the facial recognition module 108 can request that the gain control module 110 adjust the gain of the NIR camera system 104 for the current ambient-light condition. Based on the request, the gain control module 110 can automatically make the adjustment, without user interaction, to retry the face-authentication attempt with a new image captured using the adjusted gain.

Figure 2:
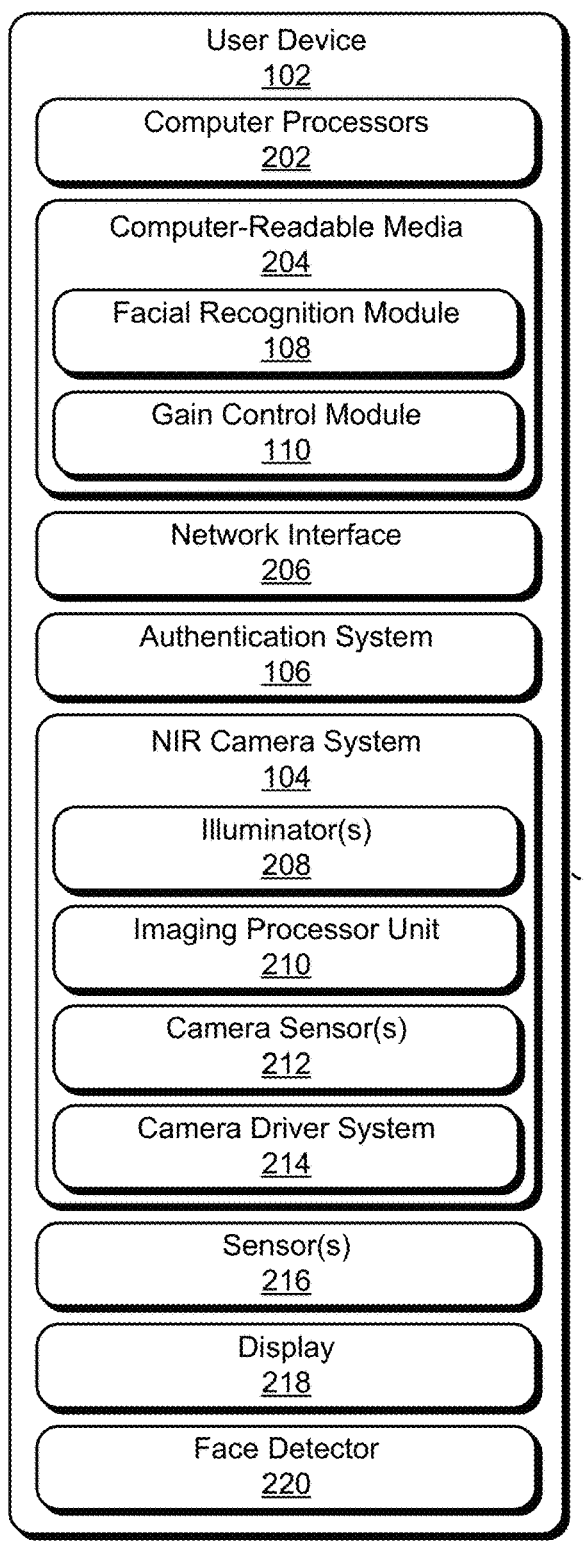
FIG. 2 illustrates an example implementation of the user device of FIG. 1 in more detail.
Figure 2:
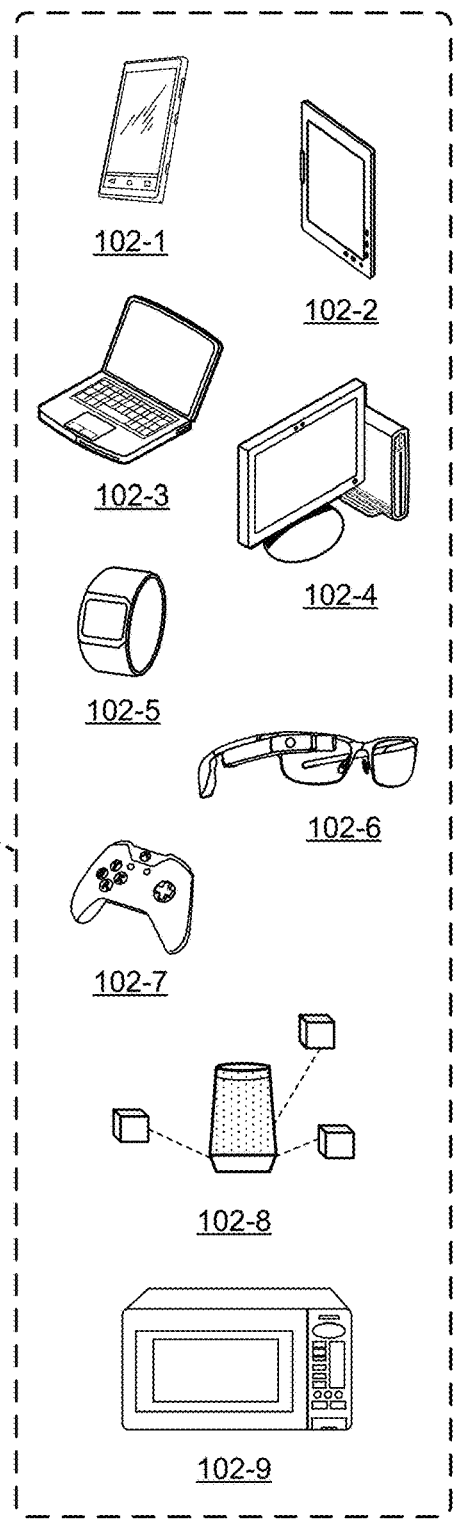

In more detail, consider FIG. 2, which illustrates an example implementation 200 of the user device 102 that can implement automatic exposure and gain control for face authentication. The user device 102 of FIG. 2 is illustrated with a variety of example devices, including a smartphone 102-1, a tablet 102-2, a laptop 102-3, a desktop computer 102-4, a computing watch 102-5, computing spectacles 102-6, a gaming system 102-7, a home-automation and control system 102-8, and a microwave 102-9. The user device 102 can also include other devices, such as televisions, entertainment systems, audio systems, automobiles, drones, track pads, drawing pads, netbooks, e-readers, home security systems, and other home appliances. Note that the user device 102 can be wearable, non-wearable but mobile, or relatively immobile (e.g., desktops and appliances).

The user device 102 also includes one or more computer processors 202 and one or more computer-readable media 204, which includes memory media and storage media. Applications and/or an operating system (not shown) implemented as computer-readable instructions on the computer-readable media 204 can be executed by the computer processors 202 to provide some or all of the functionalities described herein. For example, the computer-readable media 204 can include the facial recognition module 108 and the gain control module 110. The computer-readable media 204 includes secure storage (not shown), which is not accessible by processes or applications in the user space. The secure storage is configured to store security data (e.g., user credentials) used for privacy controls, such as controls to unlock the user device 102 (including face authentication data, password/passcode information, fingerprint data, and so on). Although this security data can be used to authenticate the user 112 to unlock the user device 102 using face authentication, pas sword/passcode authentication, fingerprint authentication, and so on, personal identifiable information about the user 112 cannot be obtained by the security data. Specifically, the user 112 cannot be identified by the security data. Rather, with previously obtained explicit permission from the user, the security data is used to determine whether data received from a user attempting to unlock the phone matches stored profile data representing a user that set up the security on the user device 102. In an example, the embeddings generated from captured NIR images of the user's face are numerical vector representations of facial features of the user 112 and are used during a face-authentication attempt for comparison to previously-stored embeddings to locate a match.

The user device 102 may also include a network interface 206. The user device 102 can use the network interface 206 for communicating data over wired, wireless, or optical networks. By way of example and not limitation, the network interface 206 may communicate data over a local-area-network (LAN), a wireless local-area-network (WLAN), a personal-area-network (PAN), a wide-area-network (WAN), an intranet, the Internet, a peer-to-peer network, point-to-point network, or a mesh network.

Various implementations of the authentication system 106 can include a System-on-Chip (SoC), one or more Integrated Circuits (ICs), a processor with embedded processor instructions or configured to access processor instructions stored in memory, hardware with embedded firmware, a printed circuit board with various hardware components, or any combination thereof. As described in further detail below, the authentication system 106 can, in a secure mode, compare authentication data received from the user 112 to stored security data for authenticating the user 112 to unlock the user device 102. In some aspects, the authentication system 106 generates the authentication data using image data obtained from the NIR camera system 104 and provides the authentication data to the secure storage to enable the secure storage to compare the authentication data to the stored security data and determine if there is a match.

The NIR camera system 104 is implemented to capture NIR image data usable to generate a three-dimensional depth map of an object, such as a user's face. The NIR camera system includes one or more illuminators 208, an imaging processor unit 210, one or more camera sensors 212, and a camera driver system 214.

The one or more illuminators 208 can include a dot projector (not shown) and a flood illuminator (not shown). The flood illuminator illuminates a subject with NIR light. The camera sensors 212 capture an image of the subject based on the NIR light output by the flood illuminator. The dot projector projects thousands of NIR dots onto the subject and the camera sensors 212 capture an image of the resulting dot pattern. The imaging processor unit 210 reads the NIR image and the dot pattern and generates a three-dimensional facial map. When multiple (e.g., two) camera sensors 212 are used, the imaging processor unit 210 calculates a difference between matching points on the different captured images, which provides a depth for respective pixels usable for generating the three-dimensional facial map.

As mentioned above and further described below, the gain control module 110 can configure the gain of the one or more camera sensors 212, in order to enable the camera sensors 212 to capture photons to produce NIR images that are usable (acceptable quality, such as having a user's face within a tolerance threshold of a target mean-luminance) for face authentication by the facial recognition module 108. Initially, the camera sensor 212 uses a default gain. If the default gain causes the NIR image to be too saturated or too desaturated (e.g., outside the tolerance threshold) so as to cause the face authentication to fail, then the gain control module 110 adjusts the gain to a value that is within a range of a known-target gain.

The camera driver system 214 enables communication between the NIR camera system 104 and other components of the user device 102, such as the computer processors 202, the gain control module 110, and the authentication system 106. The camera driver system 214 can be initiated by any suitable trigger, such as a user input received via an actuated control or pressed button, or a signal received from one or more sensors 216. In an example, proximity sensors can transmit a signal indicating that the user 112 is proximate to the user device 102 such that the user may attempt to unlock the user device 102 using face authentication. The camera driver system 214 also controls the settings for the camera sensors 212, including gain settings and exposure duration.

The one or more sensors 216 of the user device 102 can include any of a variety of sensors, such as an audio sensor (e.g., a microphone), a touch-input sensor (e.g., a touchscreen), an image-capture device (e.g., a camera or videocamera), proximity sensors (e.g., capacitive sensors), or an ambient light sensor (e.g., photodetector). In at least some implementations, the user device 102 can include a radar system (not shown) to detect a proximity of the user 112 to the user device 102, and based on that proximity, initiate one or more components and/or functions, such as initiating the NIR camera system 104 and the authentication system 106 to initiate a face-authentication attempt.

The user device 102 can also include a display device, such as display 218. The display 218 can include any suitable display device, such as a touchscreen, a liquid crystal display (LCD), thin film transistor (TFT) LCD, an in-place switching (IPS) LCD, a capacitive touchscreen display, an organic light emitting diode (OLED) display, an active-matrix organic light-emitting diode (AMOLED) display, super AMOLED display, and so forth.

In at least some aspects, the user device 102 also includes a face detector 220. The face detector 220, typically implemented in programmable hardware for speed but which could also be implemented as a combination of hardware and software, is configured to detect the user's face in the image 302 shown in FIG. 3, and more specifically, detect location information associated with the user's face in the image 302. The location information can be used to determine which regions 310 shown in FIG. 3 to meter for gain control. Metering refers to measuring an overall intensity value of an image or, in this case, particular regions of the image. The intensity value(s) measured can then be used as prior values for inputting into a gain adjustment process. The face detector 220 may be particularly useful in instances where the user 112 is holding the user device 102 in an atypical orientation (e.g., upside down), the user's face appears in a corner region (e.g., one of regions 311, 313, 317, 319), or the user's face appears in multiple regions. Because the face detector 220 is implemented in hardware, it can be implemented in a secure pipeline where software does not have access to the face data.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 through FIG. 10 illustrate some of many possible environments and devices capable of employing the described techniques.

Figure 3:
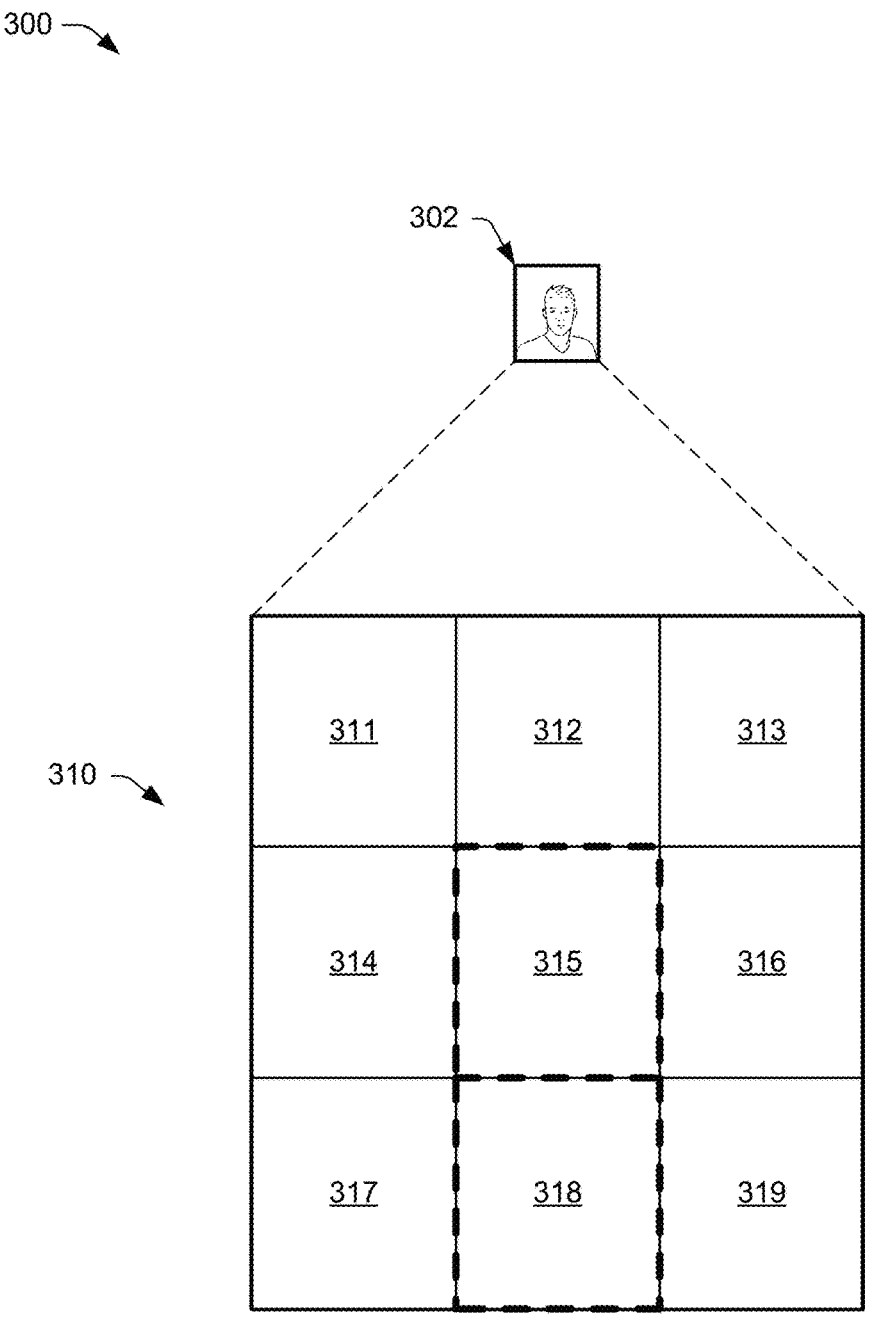
FIG. 3 illustrates an example implementation of region mapping of a near-infrared image for face authentication.

FIG. 3 illustrates an example implementation 300 of region mapping of an NIR image for face authentication. When an image 302 (e.g., NIR image) is captured by the NIR camera system 104, the image 302 can be separated into regions 310 for analysis. Specifically, the gain control module 110 can gather statistics (e.g., patch-mean statistics) from regions-of-interest of the regions 310. These regions 310 can be defined by any suitable size or shape. In one example, the regions 310 are sized according to the Rule of Thirds in photography, which essentially divides the image into nine equally sized areas, such as regions 311 to 319.

When a user attempts to unlock a user device using face authentication, the user's face may typically be located within a center region 315 of the image 302 and the user's neck, chest, and shoulders may likely be located in lower regions 317, 318, and 319. In order to reduce the amount of processing that occurs on the image 302 and consequently reduce latency of the system, and because the facial recognition module 108 only uses image data of the user's face for the face authentication, the gain control module 110 initially gathers statistics on only particular regions 310 of the image 302 where the user's face is located. For example, the gain control module 110 initially gathers statistics on the center region 315 for determining gain settings because the user's face is generally located in the center region 315. In at least some aspects, the lower-middle region 318 is used to stabilize the statistics of the center region 315. One or more other region(s) 310, however, can be metered, in addition to or in the alternative of regions 315 and 318, based on the location of the user's face in the image 302. Although the center region 315 and the lower-middle region 318 are illustrated as being the same size, they can be any suitable size, including different sizes from one another. Further details are described below of techniques to quickly determine which region(s) 310 include the user's face. By metering only the regions-of-interest such as the user's face, the user device 102 can more accurately and quickly determine and set the gain to an appropriate setting to allow for capture of high-quality NIR image data usable for face authentication. In some instances, this limited-region metering reduces inaccuracies caused by highly-illuminated objects located in other regions 310 of the image 302 that are not part of the user's face (e.g., the sun, other light source) but which could affect the gain calculation of the overall image.

Because the NIR camera system 104 operates in the NIR spectrum with active illumination, the light provided by the illuminator(s) 208 is leveraged, as much as possible, during the time for which the illuminators 208 are providing light. Generally, the illuminators 208 provide light for a short period of time, e.g., a flash of light. The gain control module 110 fixes an exposure time (e.g., pulse width) for the camera sensors 212, which directly corresponds to the emission of light by the illuminators 208. Based on the ambient conditions, however, the gain control module 110 also adjusts the gain (e.g., analog gain of the camera sensors 212). For example, if the ambient condition is too bright, then the gain control module 110 reduces the gain setting. If, however, the ambient condition is too dark, then the gain control module 110 increases the gain setting. Accordingly, the gain control module 110 attempts to maximize the amount of NIR light captured from the illuminators 208 of the NIR camera system 104.

The face detector 220 can be used to quickly detect which region(s) 310 include the user's face, which affects the selection of particular regions 310 to meter. Some examples are provided below with respect to FIGS. 5, 6, 7, and 9.

In some examples, the user device 102 can use one or more additional sensors 216 or techniques to detect and locate which regions 310 include the user's face in order to limit the gain statistics to those regions-of-interest. This may allow the gain to be set appropriately even when the user's face is not located in the center region 315. The sensors 216 can be used to detect how the user 112 is holding the user device 102, such as whether the user device 102 is in a landscape or a portrait orientation. This information can be used to quickly determine which regions 310 to initially meter. Examples are described below with respect to FIGS. 8 and 9.

To maintain the latency of the system as low as possible, the NIR camera system 104 initially uses a gain that is estimated to be useful in the majority of situations. For example, the NIR camera system 104 first uses a default gain setting to capture the image 302 of the user's face. The default gain setting can be a stored setting that is defined originally by a manufacturer or defined by a previous adjustment to the gain. For example, the NIR camera system 104 can initially use the gain setting that was set during a most-recent face-authentication attempt. Any suitable gain setting can be used as the default gain. One example is a highest gain, which is typically useful indoors in lower ambient lighting. The high gain setting typically allows for a successful face authentication on the first attempt when indoors. When the user moves outdoors where the ambient conditions are brighter, the NIR camera system 104 initiates a face-authentication attempt using the high gain, but the resulting image may be too saturated for face authentication. When the first attempt fails, the gain control module 110 transmits a signal to a face-unlock pipeline to pause the face-authentication attempt until a mean luminance is adjusted to within a threshold value of a target mean-luminance. The gain control module 110 meters the regions-of-interest to calculate an adjustment to the gain setting and then sets the gain setting for the NIR camera system 104 to capture another image for the face authentication. For example, the gain control module 110 may set resistors (not shown) of the camera sensors 212 (e.g., analog gain sensor) for gain control or may cause the camera driver system 214 to set the resistors for gain control. The mean of the user's face does not carry any biometric information but is instead simply a byte that can be safely passed to the camera driver system 214, which adds to the robustness of the system.

In aspects, the gain is used for a dot image and a flood image obtained using the dot projector and flood illuminator, respectively. Generally, the flood image (e.g., a diffused-light image) is used for face authentication. Accordingly, statistics from the flood image are used to meter the statistics for gain control. The same gain can be used for both of the flood and dot images when the NIR camera system 104 is pulsing between the dot projector and the flood illuminator. However, different gains can be used for the dot and flood images, such as if the illuminators are flashing at different brightness levels.

In some implementations, the NIR camera system 104 can use different modes for different ambient lighting conditions. For example, to capture the most photons in the light, the camera sensors 212 may use a higher exposure time (e.g., five milliseconds) indoors to project more light and capture more photons, but use a lower exposure time (e.g., one millisecond) outdoors to reduce as much ambient light as possible and avoid saturating the pixels. Each mode may have a fixed exposure time and can be implemented in combination with the automatic exposure and gain control described herein. The user device 102 can select which mode to use based on any of a variety of signals, such as a signal from a light sensor. Alternatively, the mode can be selected based on the statistics themselves. For example, in a dark room using a one millisecond exposure time and a maximum possible gain, the region-of-interest may still be too dark for face authentication. Based on this information, the user device 102 can switch modes to a different mode with a longer exposure time.

FIGS. 4 to 9 illustrate example implementations of the user device 102 utilizing auto exposure and gain control for face authentication. The user 112 is merely shown in FIGS. 4 to 9 for purposes of illustration and description of the techniques and systems described herein. In aspects, the content which the NIR camera system 104 captures is not rendered on the display 218 of the user device 102. This is because the NIR camera system 104 is not capturing a color image but is instead capturing image data in the infrared spectrum, in particular the near-infrared spectrum. Further, presenting the NIR image may increase the latency of the system, which is undesirable. In addition, the authentication system 106 is configured to authenticate the user in less than one second (e.g., 500 milliseconds, 350 milliseconds, 200 milliseconds, 150 milliseconds), which would give very little time for the user 112 to view the rendered image. Accordingly, the display 218 may remain off or may present information corresponding to a locked state of the user device 102.

Figure 4:
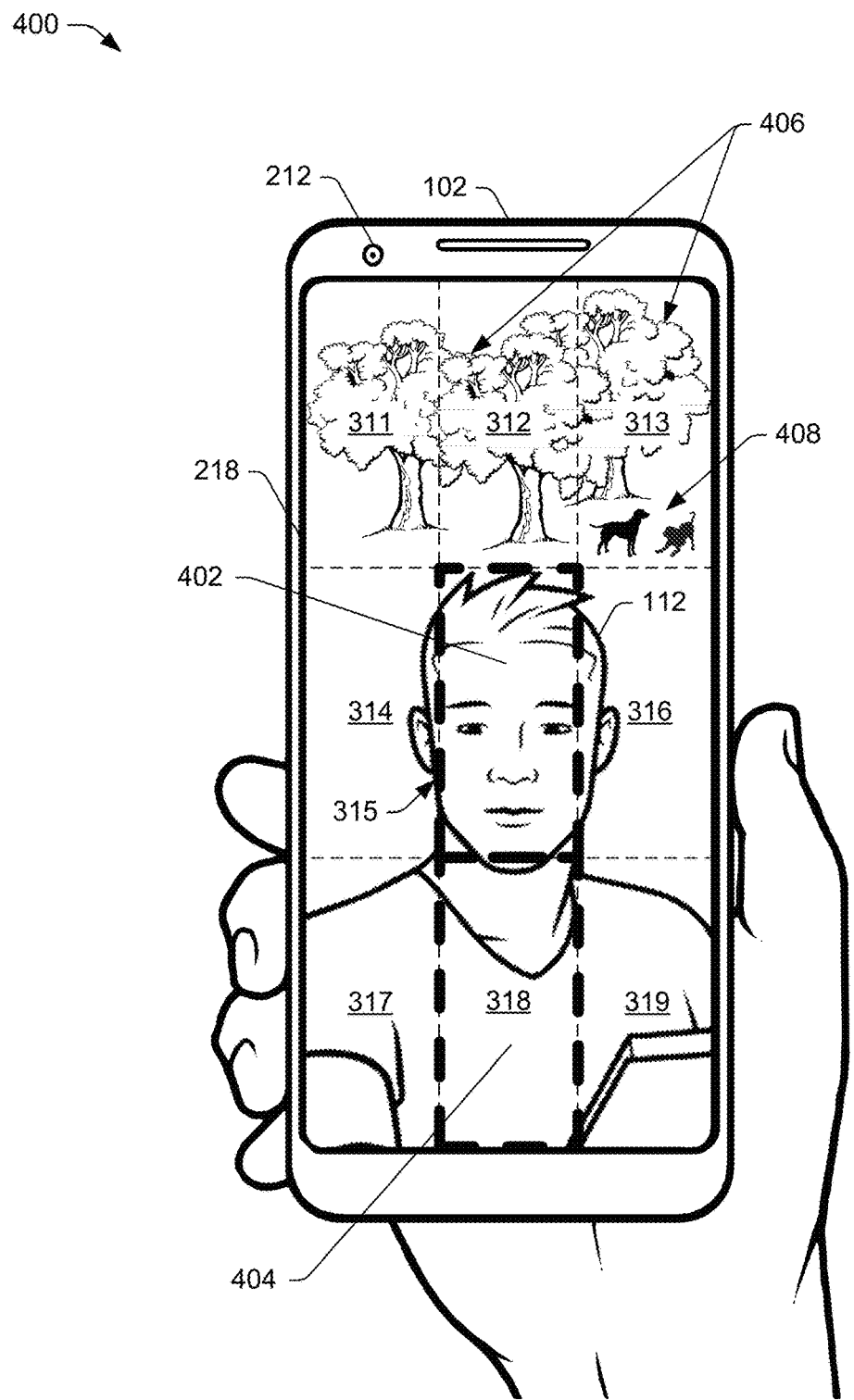
FIG. 4 illustrates an example implementation of a user device using automatic exposure and gain control for face authentication.

FIG. 4 illustrates an example 400 of a user device using automatic exposure and gain control for face authentication. Although the user 112 is shown on the display 218 of the user device 102, the user device 102 may not present any such rendering during a face-authentication attempt. The images shown in FIG. 4 are for purposes of illustration and description herein.

In the illustrated example 400, the user 112 is holding the user device 102 in a portrait orientation with the camera sensor 212 of the NIR camera system 104 directed toward the user's face 402. In this implementation, the user's face 402 is located in the center region 315 and the user's chest 404 is located in the lower-middle region 318. In this position and orientation, the gain control module 110 can limit metering to the center region 315 and the lower-middle region 318. Although trees 406 and dogs 408 in the background might be interesting in a color photograph, these elements are not necessary nor usable for face authentication and can therefore be disregarded. In some aspects, background elements can distort the gain calculation, particularly if the background elements include a bright light. Thus, metering only the regions 315 and 318 in this instance allows for a more accurate gain adjustment to capture an image of the user's face 402 for face authentication. If the face region is small, causing the gain in the center region 315 and the lower-middle region 318 to increase and saturate the pixels with low statistics, the gain control module 110 can use a percentage of saturated pixels as statistics to perform the gain control.

Figure 5:
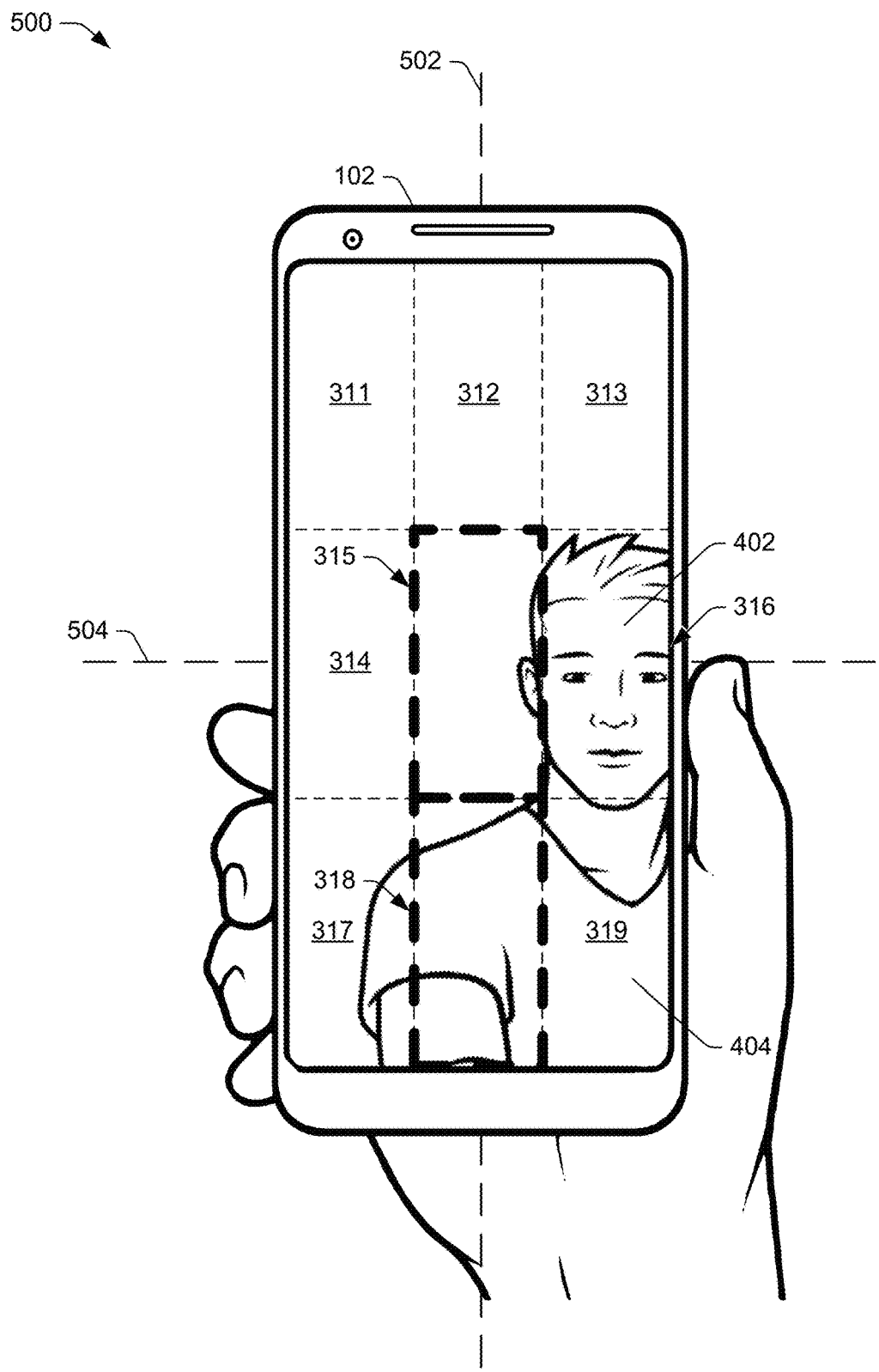
FIG. 5 illustrates an example implementation of a user device using automatic exposure and gain control for face authentication, where the user's face is off-center.

FIG. 5 illustrates an example implementation 500 of a user device using automatic exposure and gain control for face authentication, where the user's face is off-center. In some cases, the user 112 may hold the user device 102 in a manner that causes the camera sensors 212 to not be directly facing the user 112. For example, the user 112 may hold the user device 102 rotated about a longitudinal axis 502 (or a lateral axis 504) effective to cause the user's face 402 to be located off-center and primarily in another region. In this example 500, the user's face 402 is located in a center-right region, e.g., the region 316. Because of the way the user is holding the user device 102, the user's face 402 is not in the region 315 that is being used as a prior for the user's head. However, statistics from one or more of lower regions 317, 318, and 319 may still be useful. Although the user's face 402 is not located in the center region 315, even if the background is bright, statistics from one or more of the lower regions 317, 318, and 319 can be used to change the gain without over-indexing on background scenery or other objects included in the center region 315 or another region. Here, the lower-middle region 318 includes a portion of the user's chest 404 as well as the user's shoulder, which may provide patch-mean statistics sufficient to stabilize the patch-mean statistics of the center region 315 for updating the gain to within a tolerance range of the target gain. Using the lower regions 317 to 319 can reduce the potential of mis-metering.

In some aspects, however, the face detector 220 may be used to detect a location in the image that includes a face. Here, the user's face 402 may be detected in region 316. Based on the detection of the face in region 316, the gain control module 110 can meter the region 316 to obtain patch-mean statistics for determining gain updates.

Figure 6:
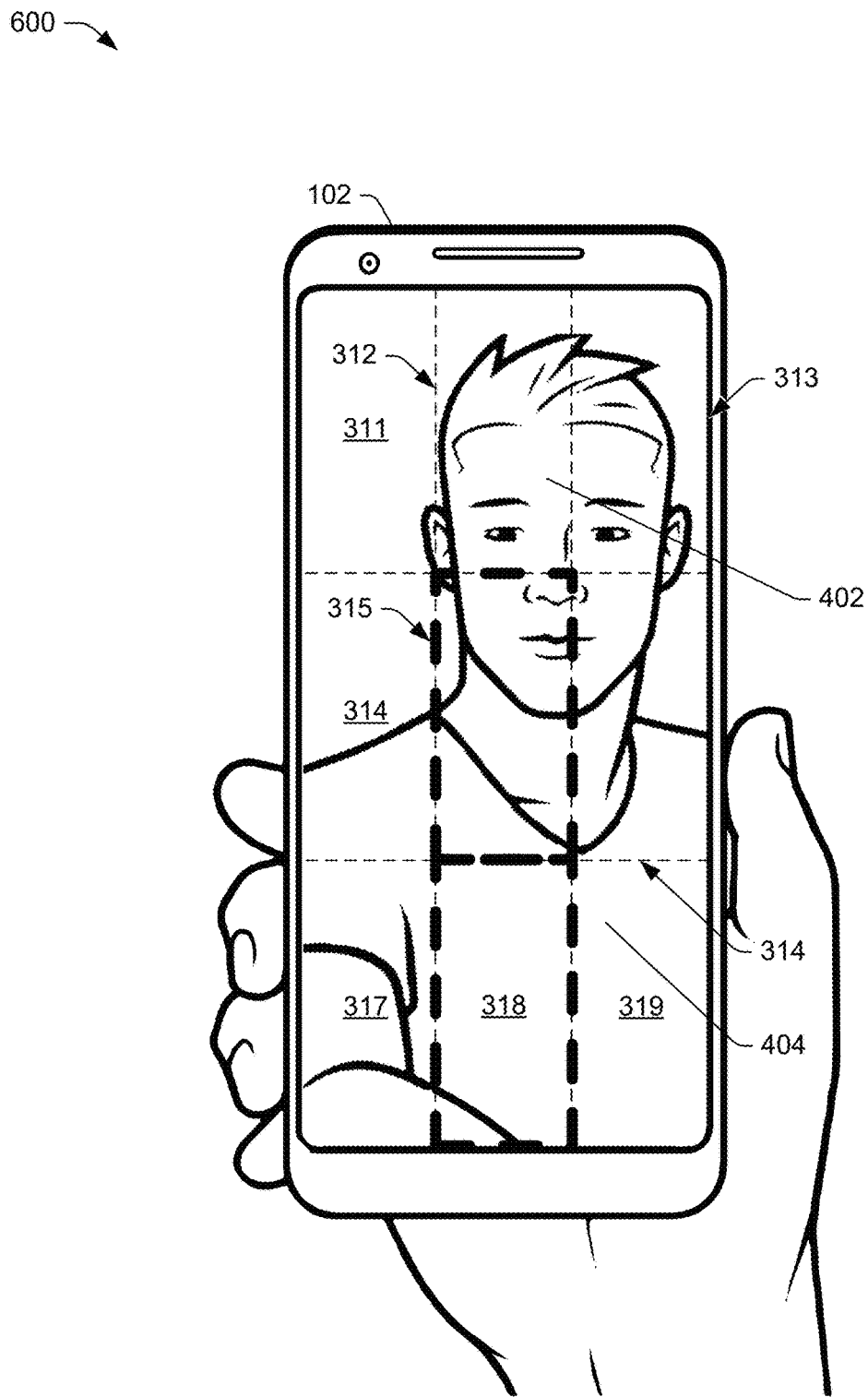
FIG. 6 illustrates an example implementation of a user device using automatic exposure and gain control for face authentication, where the user's face is in a plurality of regions of the image.

FIG. 6 illustrates an example implementation 600 of a user device using automatic exposure and gain control for face authentication, where the user's face is in a plurality of regions of the image. In the illustrated example 600, the user's face 402 is included in multiple regions, e.g., regions 312, 313, 315, and 316, and the user's chest 404 is included in multiple regions, e.g., regions 318 and 319. Although the region-of-interest is larger than the center region 315 and the lower-middle region 318, the entire face 402 of the user may not be necessary to determine the gain adjustment. Rather, in this example, the gain control module 110 may still use only the center region 315 and the lower-middle region 318 for gain control. This is because a portion of the user's face 402 is located in the center region 315 and a portion of the user's chest is located in the lower-middle region 318, which may be sufficient for obtaining the patch-mean statistics (e.g., mean-luminance value of a region) usable to determine an update in the gain to enable capture of an NIR image that can be used for face authentication. Accordingly, constraining the patch-mean statistics to the region-of-interest (e.g., the regions 315 and 318) adds to the robustness of the system and reduces latency costs associated with computing or obtaining patch-mean statistics of the entire image.

Figure 7:
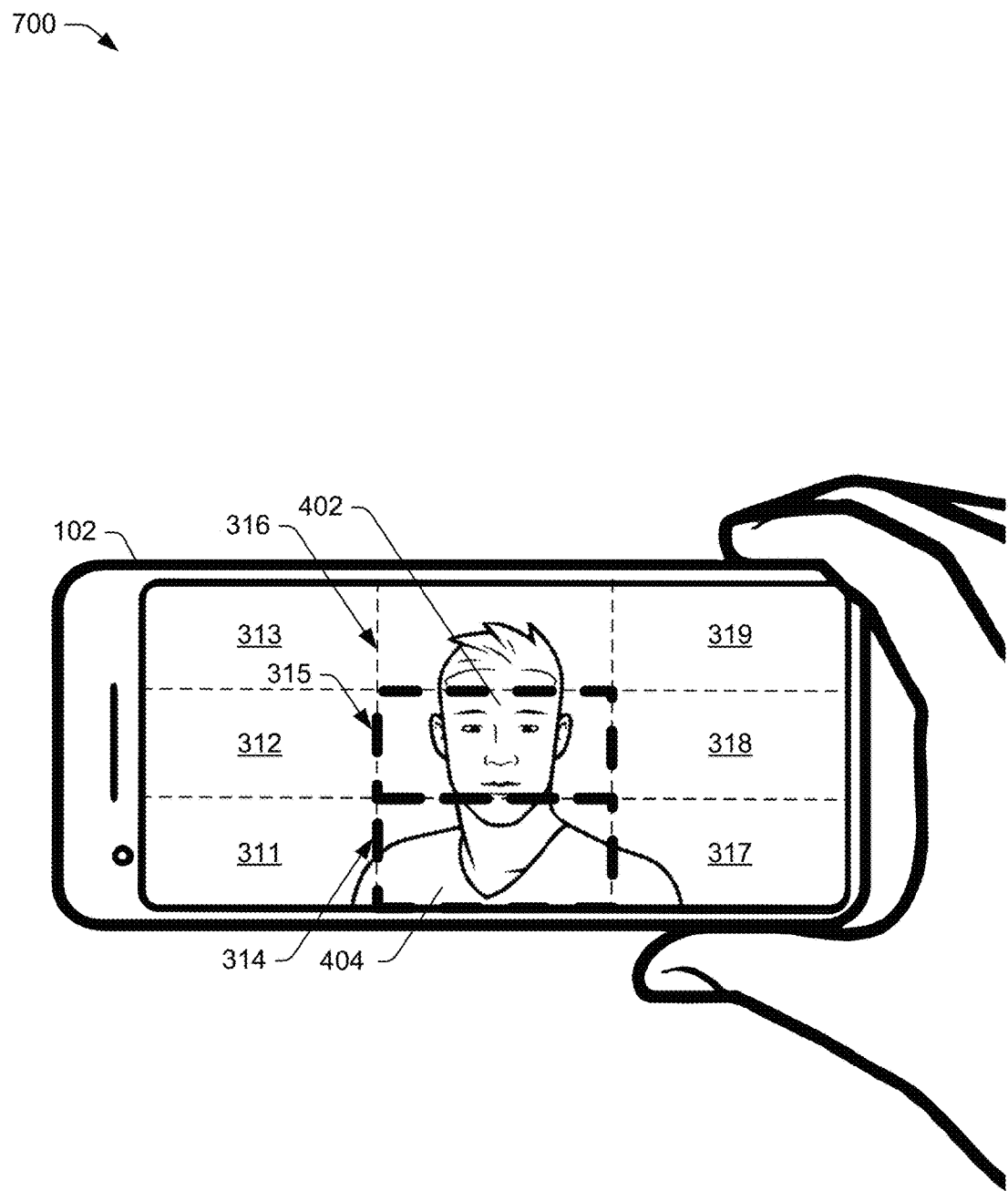
FIG. 7 illustrates an example implementation of a user device using automatic exposure and gain control for face authentication, where the user device is held in a landscape orientation.

FIG. 7 illustrates an example implementation 700 of a user device using automatic exposure and gain control for face authentication, where the user device is held in a landscape orientation. The user device 102 can detect its orientation (e.g., portrait or landscape) using one or more of the sensors 216, such as an accelerometer, an inertial measuring unit, a gyro sensor, or a combination of sensors. Based on detection of the orientation of the user device 102, the NIR camera system 104 can change the regions that are metered from default regions (e.g., regions 315 and 318) to other regions that are more likely to include the user's face 402 and the user's chest 404, such as regions 315 and 314, respectively. In example 700, the regions-of-interest include the center region 315 and region 314, where the region 314 is the lower-middle region relative to the orientation of the user device 102 (while region 318 is now a right-middle region relative to the orientation of the user device 102). Selection of regions-of-interest relative to the user device's orientation may occur prior to capture of the image by the NIR camera system 104, based on the signals received from the sensors 216.

Figure 8:
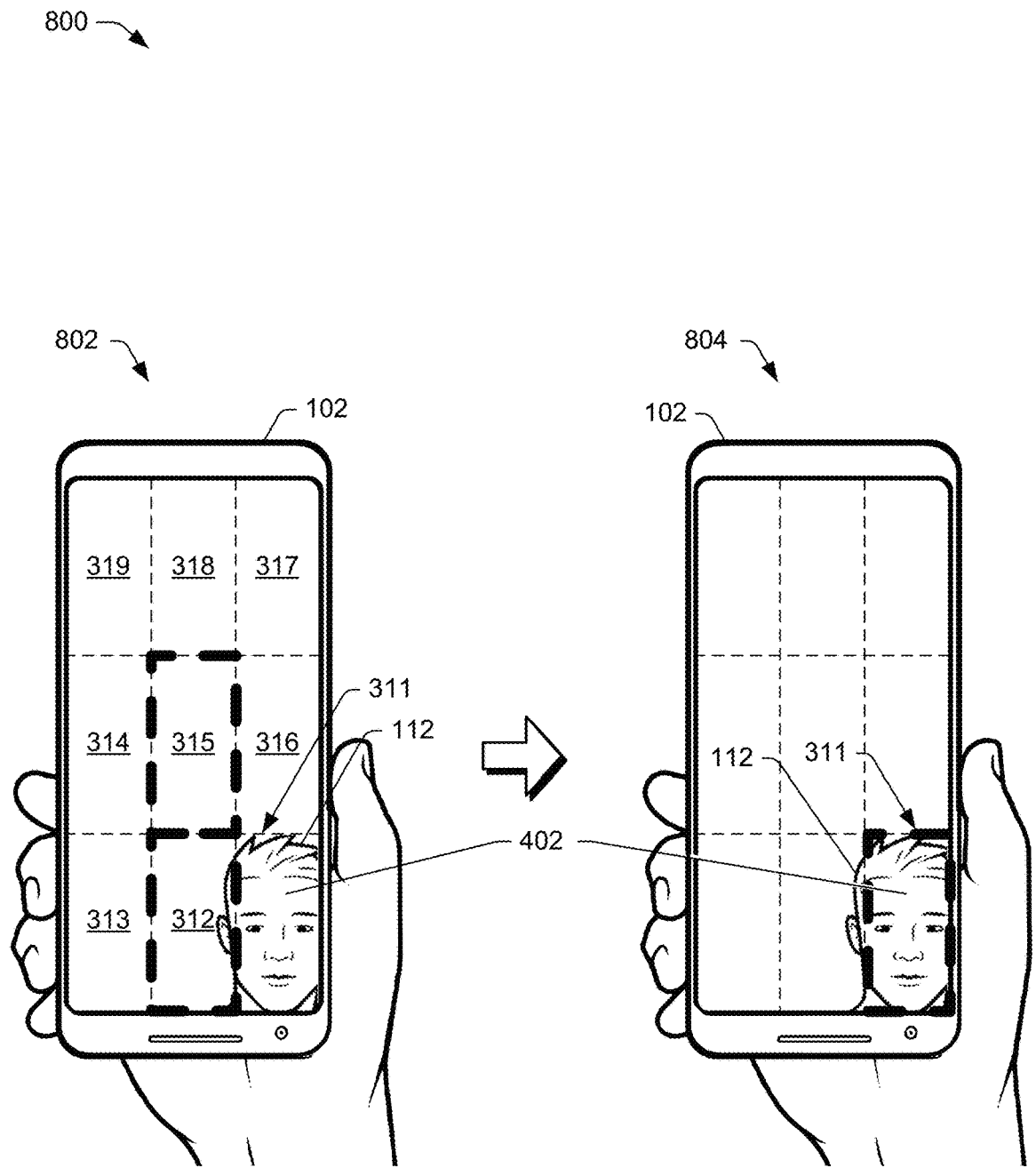
FIG. 8 illustrates an example implementation of a user device using automatic exposure and gain control for face authentication, where the user device is held upside down and the user's face is not in the center of the image.

FIG. 8 illustrates an example implementation 800 of a user device using automatic exposure and gain control for face authentication, where the user device is held upside down and the user's face is not in the center of the image. In the illustrated example, the user device 102 is held upside-down relative to the user 112. As above, the sensors 216 can be used to detect an orientation of the user device 102 and, based on the orientation, the region-of-interest in the image for metering is changed. In example 802, the regions-of-interest include the center region 315 and region 312, where the region 312 is the lower-middle region relative to the orientation of the user device 102 (while region 318 is now an upper-middle region relative to the orientation of the user device 102).

In the example 802, however, the user's face 402 is off-center and the user's chest 404 is not in the image. Accordingly, as described above, the face detector 220 may run in parallel with the gain control module 110 to detect a location in the image that includes a face. Here, the user's face 402 is detected in region 311. Based on the detection of a face in region 311, the gain control module 110 can, as shown in example 804, meter the region 311 to obtain patch-mean statistics for determining gain updates. In this way, other objects (not shown) in the background that may impact the automatic gain adjustment can be disregarded when controlling the gain for face authentication. If the adjustment to the gain causes objects in the background to become saturated, the image may still be usable if the user's face in the image is within a tolerance threshold mean-luminance of a target mean-luminance for face authentication. Therefore, it is not about what the user perceives as a high-quality image, but what is usable by the facial recognition module for face authentication.

Example Methods

Figure 9:
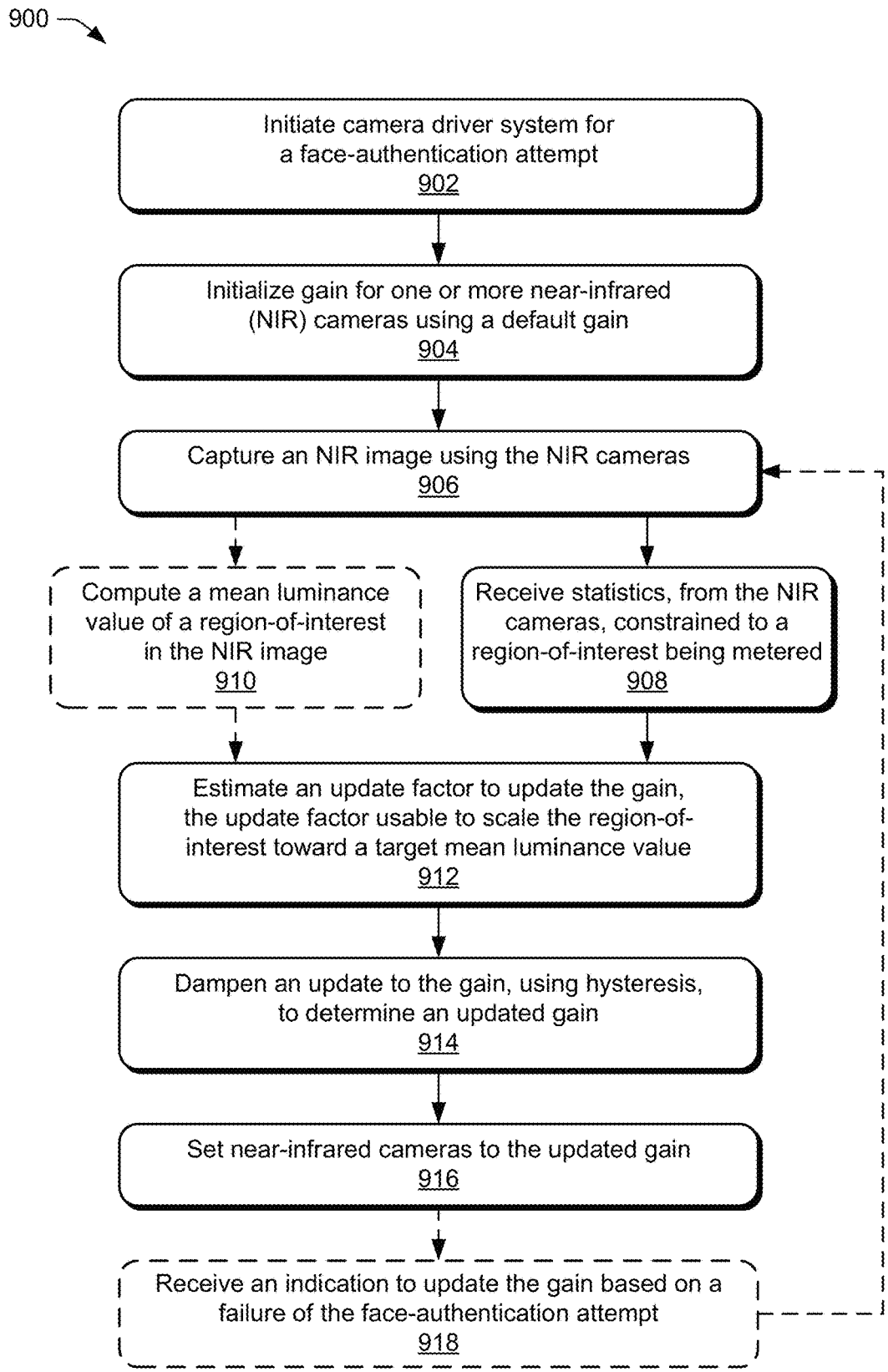
FIG. 9 depicts an example method for automatic exposure and gain control for face authentication.

FIG. 9 depicts an example method 900 for automatic exposure and gain control for face authentication. The method 900 can be performed by the user device 102, which uses the gain control module 110 to automatically adjust the gain of the NIR camera system 104 in order to capture an NIR image of the user's face that is usable for authentication. The user device 102 uses only a region-of-interest to determine updates to the gain when the user's face in the image is not suitable (e.g., over-saturated or under-saturated) for face authentication.

The method 900 is shown as a set of blocks that specify operations performed but are not necessarily limited to the order or combinations shown for performing the operations by the respective blocks. Further, any of one or more of the operations may be repeated, combined, reorganized, or linked to provide a wide array of additional and/or alternate methods. In portions of the following discussion, reference may be made to the example operating environment 100 of FIG. 1 or to entities or processes as detailed in FIGS. 2-8, reference to which is made for example only. The techniques are not limited to performance by one entity or multiple entities operating on one device.

At 902, a camera driver system of a user device is initiated for a face-authentication attempt. For example, the camera driver system 214 of the NIR camera system 104 of the user device 102 can be triggered to initiate the NIR camera system 104 for face authentication.

At 904, the camera driver system initializes a gain for one or more near-infrared cameras using a default gain. The default gain can be a gain that was used in a most-recent face-authentication attempt. Alternatively, the default gain can be a fixed gain value, such as a gain previously calculated from a well-exposed indoor image.

At 906, an image is captured using the NIR cameras. For example, the illuminators 208 radiate NIR light and the camera sensors 212 are exposed to capture photons corresponding to the NIR light. The image processor unit 210 processes the captured photons to generate the image 302 that is usable for the face-authentication attempt.

At 908, statistics are received, from the camera sensors 212 of the NIR camera system, of the NIR image constrained to a region-of-interest being metered. For example, the camera sensors 212 of the NIR camera system 104 may provide statistics that correspond to only the region-of-interest in the NIR image rather than statistics for the entire NIR image. The region-of-interest may include a region that includes at least the user's face. The region-of-interest may also include the user's chest. The region-of-interest may be separated into multiple regions-of-interest, such as one or more regions including the user's face and one or more other regions including the user's chest and/or shoulders. The region-of-interest is not the entire image but is a constrained area of the NIR image. The statistics may include luminance data (e.g., intensity measurements) of the regions-of-interest or of each region-of-interest. In some aspects, the luminance data includes a mean-luminance value of the region-of-interest.

Optionally, at 910, the mean-luminance value is computed for the region-of-interest of the NIR image. In examples in which the NIR cameras do not generate the statistic, then the gain control module 110 can compute the mean-luminance value of the region-of-interest in the NIR image. As above, the region-of-interest may include the center region 315 and the lower-middle region 318 of the image 302 if the user device 102 is in the portrait orientation. Metering only the regions-of-interest reduces the potential of mis-metering. If the user's face 402 moves to a different region (e.g., region 316 as illustrated in example 500 of FIG. 5), the error may still be reduced because the user's chest 404 may remain in at least one of the lower regions, e.g., regions 317, 318, 319, and can be used as a reference, which adds robustness. In addition, the regions-of-interest that are metered are used as prior values to set the gain during the next face-authentication attempt.

In some aspects, the region-of-interest may depend on an orientation in which the user 112 is holding the user device 102, such as a portrait orientation or a landscape orientation. Some of the sensors 216, such as accelerometers and/or gyro sensors, can be used to indicate the orientation of the user device 102, which can influence which regions 310 to use for metering. In addition, the region-of-interest may depend on which region includes the user's face because face authentication is concerned with authenticating the user based on the NIR image of the user's face and not concerned with other objects or background scenery. Therefore, the face detector 220 can be used to detect the user's face in the image 302 and indicate a location, area, or region 310 in the image 302 that includes the user's face. Based on this indication, the gain control module 110 can compute the mean-luminance value of only the particular region(s) that include the user's face and, optionally, a second region that is directly below and adjacent to the particular region with the user's face. The second region may include the user's chest, which can be metered for luminance values usable to stabilize the statistics.

At 912, an update factor is estimated to update the gain. The update factor is usable to scale the region-of-interest toward a target mean-luminance value, which may be a predetermined value. The update factor may be computed by dividing the target mean-luminance value by an average mean of the regions-of-interest. For example, the update factor for the gain can be determined based on the following Equation 1:

$$\text{gain\_update\_factor} = mu\_\text{target}/(0.5*(mu\_c + mu\_b)) \quad \text{Equation 1}$$

In Equation 1, the term mu target refers to the target mean-luminance value, the term mu_c refers to the mean-luminance value of the region 310 that includes the user's face (e.g., the center region 315), and the term mu_b refers to the region 310 that includes the user's chest (e.g., the lower-middle region 318).

At 914, an update to the gain is dampened, using hysteresis, to determine an updated gain. The hysteresis refers to a tolerance range that includes the target mean-luminance value. Although the target mean-luminance value is an ideal target, other mean-luminance values within the tolerance range may also be sufficient for purposes of face authentication. Therefore, to avoid overshooting the target mean-luminance value, the gain g is updated using some hysteresis with the following Equation 2:

$$g=g*\text{gain\_update\_factor} \quad \text{Equation 2}$$

In an example, the update to the gain is dampened, by using a percentage (e.g., 95%, 90%, 88%) of the update to the gain. This dampening increases the likelihood of the update falling within the tolerance range to enable a new image to be captured that is "good-enough" (not over-saturated or under-saturated) for face authentication. The hysteresis improves the robustness of the system and reduces latency by reducing errors in the gain update.

In an example, if the camera driver system 214 determines that the gain value is correct but the facial recognition module 108 indicates that the user's face is too saturated, then that indication can be used to trigger the camera driver system 214 to update the gain again. Perhaps the user 112 is holding the user device 102 such that the user's face is in a lower region 317, 318, or 319 and the user's chest is not in the image 302.

At 916, the NIR cameras are set to the updated gain. The updated gain allows the NIR camera system 104 to capture a new image in the NIR spectrum for a second face-authentication attempt. Potentially, the new image includes the user's face according to a mean-luminance value that is acceptable for face authentication.

Optionally, at 918, an indication is received to update the gain based on a failure of the face-authentication attempt. If such an indication is received, then the method returns to 906 to repeat the gain-update process, essentially placing the face-authentication pipeline in a loop. Each time through the loop, the gain control is improved (e.g., the gain is updated to a new dampened update) and consequently, each new NIR image includes a region-specific mean-luminance value that is closer to the target mean-luminance value for face authentication than the prior image.

Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Throughout this disclosure examples are described where a computing system (e.g., the user device 102, a client device, a server device, a computer, or other type of computing system) may analyze information (e.g., radar, inertial, and facial-recognition sensor data) associated with a user, such as the user's face 402. The computing system, however, can be configured to only use the information after the computing system receives explicit permission from the user of the computing system to use the data. For example, in situations where the user device 102 analyzes sensor data for facial features to authenticate the user 112, individual users may be provided with an opportunity to provide input to control whether programs or features of the user device 102 can collect and make use of the data. The individual users may have constant control over what programs can or cannot do with sensor data. In addition, information collected may be pre-treated in one or more ways before it is transferred, stored, or otherwise used, so that personally-identifiable information is removed. For example, before the user device 102 shares sensor data with another device (e.g., to train a model executing at another device), the user device 102 may pre-treat the sensor data to ensure that any user-identifying information or device-identifying information embedded in the data is removed. Thus, the user may have control over whether information is collected about the user and the user's device, and how such information, if collected, may be used by the computing device and/or a remote computing system.

Example Computing System

Figure 10:
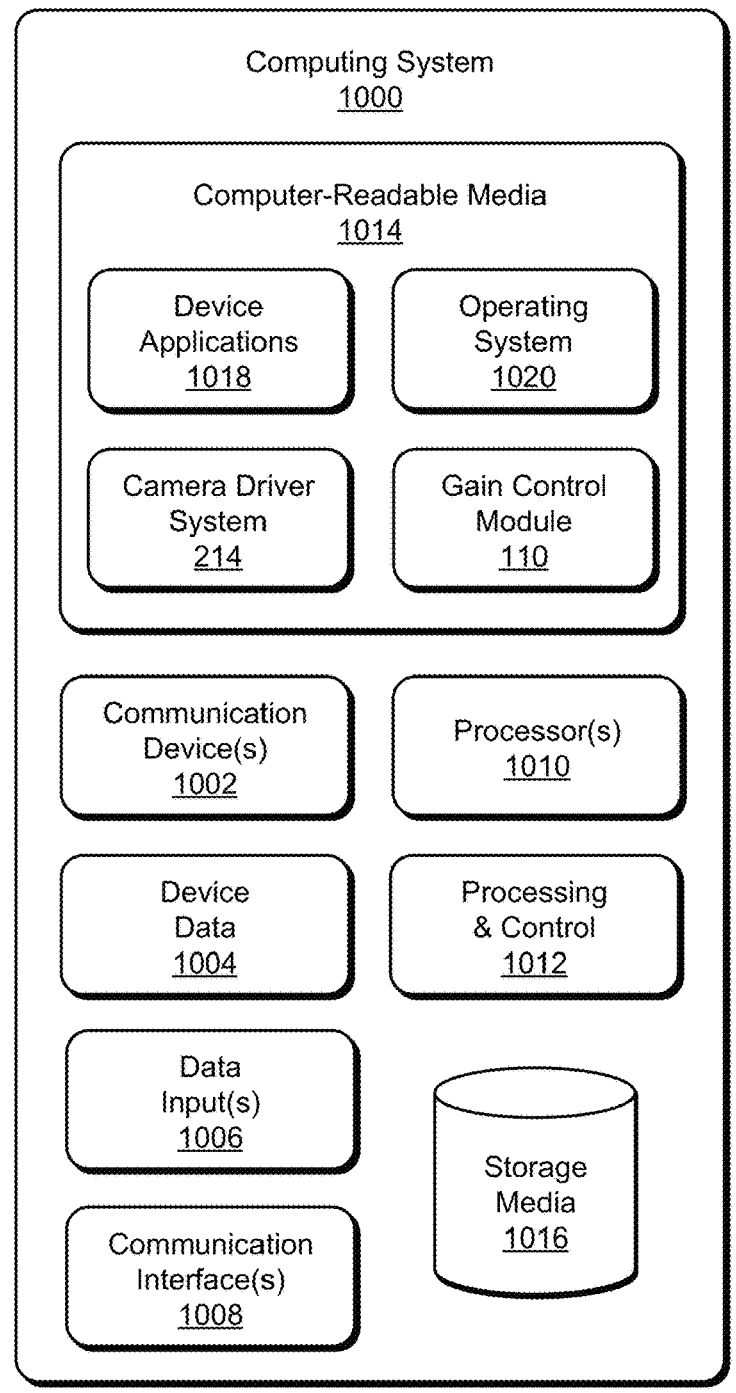
FIG. 10 illustrates an example computing system that can be implemented as any type of client, server, and/or electronic device as described with reference to FIGS. 1-9 to implement, or in which techniques may be implemented that enable, automatic exposure and gain control for face authentication.

FIG. 10 illustrates various components of an example computing system 1000 that can be implemented as any type of client, server, and/or electronic device as described with reference to the previous FIGS. 1-9 to implement automatic exposure and gain control for face authentication.

The computing system 1000 includes communication devices 1002 that enable wired and/or wireless communication of device data 1004 (e.g., radar data, authentication data, reference data, received data, data that is being received, data scheduled for broadcast, and data packets of the data). The device data 1004 or other device content can include configuration settings of the device, media content stored on the device, and/or information associated with a user of the device (e.g., an identity of a person within a radar field or customized air gesture data). Media content stored on the computing system 1000 can include any type of radar, biometric, audio, video, and/or image data. The computing system 1000 includes one or more data inputs 1006 via which any type of data, media content, and/or inputs can be received, such as human utterances, interactions with a radar field, touch inputs, user-selectable inputs or interactions (explicit or implicit), messages, music, television media content, recorded video content, and any other type of audio, video, and/or image data received from any content and/or data source.

The computing system 1000 also includes communication interfaces 1008, which can be implemented as any one or more of a serial and/or a parallel interface, a wireless interface, any type of network interface, a modem, and as any other type of communication interface. The communication interfaces 1008 provide a connection and/or communication links between the computing system 1000 and a communication network by which other electronic, computing, and communication devices communicate data with the computing system 1000.

The computing system 1000 includes one or more processors 1010 (e.g., any of microprocessors, controllers, or other controllers) that can process various computer-executable instructions to control the operation of the computing system 1000 and to enable techniques for, or in which can be implemented, automatic exposure and gain control for face authentication. Alternatively or additionally, the computing system 1000 can be implemented with any one or combination of hardware, firmware, or fixed logic circuitry that is implemented in connection with processing and control circuits, which are generally identified at 1012. Although not shown, the computing system 1000 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1000 also includes computer-readable media 1014, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. The computing system 1000 can also include a mass storage media device (storage media) 1016.

The computer-readable media 1014 provides data storage mechanisms to store the device data 1004, as well as various device applications 1018 and any other types of information and/or data related to operational aspects of the computing system 1000. For example, an operating system 1020 can be maintained as a computer application with the computer-readable media 1014 and executed on the processors 1010. The device applications 1018 may include a device manager, such as any form of a control application, software application, signal-processing and control modules, code that is native to a particular device, an abstraction module, an air gesture recognition module, and other modules. The device applications 1018 may also include system components, engines, modules, or managers to implement automatic exposure and gain control for face authentication, such as the gain control module 110 and the camera driver system 214. The computing system 1000 may also include, or have access to, one or more machine-learning systems.

Several examples are described below.

Example 1. A method for adaptive gain control in a near-infrared camera system for face authentication on a user device, the method comprising: in response to initiation of a camera driver system, initializing a gain for the near-infrared camera system using a default gain; ascertaining patch-mean statistics of one or more regions-of-interest of a most-recently captured image that was captured by the near-infrared camera system computing an update for the gain to provide an updated gain that is usable to scale the one or more regions-of-interest toward a target mean-luminance value; and setting the initialized gain for the near-infrared camera system to the updated gain for a next face-authentication attempt.

Example 2. The method of example 1, further comprising: subsequent to setting the initialized gain of the near-infrared camera system to the updated gain, receiving an indication from a facial recognition module to update the gain again; and responsive to the indication, repeating the ascertaining, the computing, and the setting to update the updated gain to a new dampened update.

Example 3. The method of any one of example 1 or example 2, wherein the ascertaining includes computing the patch-mean statistics of the one or more regions-of-interest, the one or more regions-of-interest comprising less than the entire image.

Example 4. The method of any one of example 1 or example 2, wherein the ascertaining includes receiving the patch-mean statistics from one or more sensors, the received patch-mean statistics constrained to the one or more regions-of-interest.

Example 5. The method of any one of the preceding examples, wherein the one or more regions-of-interest include a center region and a lower-middle region according to a rule of thirds in photography.

Example 6. The method of example 5, wherein patch-mean statistics of the lower-middle region are used to stabilize patch-mean statistics of the center region.

Example 7. The method of any one of the preceding examples, wherein the patch-mean statistics include mean-luminance values corresponding to the one or more regions-of-interest.

Example 8. The method of any one of the preceding examples, further comprising: prior to ascertaining the patch-mean statistics of the one or more regions-of-interest, detecting location information corresponding to a face of a user in the most-recently captured image; and selecting the one or more regions-of-interest from a plurality of regions of the most-recently captured image based on the location information corresponding to the face of the user.

Example 9. The method of any one of the preceding examples, further comprising dampening the update in the initialized gain using hysteresis prior to setting the initialized gain to the updated gain for the next face-authentication attempt.

Example 10. The method of any one of the preceding examples, wherein setting the initialized gain comprises setting one or more resistors of an analog gain sensor of the near-infrared camera system.

Example 11. The method of any one of the preceding examples, further comprising: receiving, from one or more sensors, a signal indicating an orientation of the user device; and based on the orientation of the user device, selecting particular regions of a plurality of regions of the image to use as the one or more regions-of-interest for the adaptive gain control.

Example 12. The method of example 11, wherein the one or more sensors include one or more of an accelerometer, an inertial measuring unit, or a gyro sensor.

Example 13. The method of any one of the preceding examples, further comprising: receiving, from a face detector implemented in hardware, an indication of one or more regions of a plurality of regions that include the face of the user; and selecting the indicated one or more regions as the one or more regions-of-interest to use for the adaptive gain control.

Example 14. The method of any one of the preceding examples, further comprising maintaining a fixed exposure time during the adaptive gain control.

Example 15. A computing system comprising: a near-infrared camera system for capturing image data of a user for face authentication; a camera driver system configured to drive the near-infrared camera system; a processor; and computer-readable instructions which, when executed by the processor, cause the computing system to perform the method of any one of the preceding examples.

CONCLUSION

Although implementations of techniques for, and apparatuses enabling automatic exposure and gain control for face authentication have been described in language specific to features and/or methods, it is to be understood that the subject of the appended claims is not necessarily limited to the specific features or methods described. Rather, the specific features and methods are disclosed as example implementations of automatic exposure and gain control for face authentication.

What is claimed is:

1. A method for adaptive gain control in a near-infrared camera system for face authentication on a user device, the method comprising:
in response to initiation of a camera driver system, initializing a gain for the near-infrared camera system using a default gain;
ascertaining patch-mean statistics of one or more regions-of-interest of a most-recently captured image that was captured by the near-infrared camera system, the one or more regions-of-interest including a center region and a lower-middle region according to the Rule of Thirds in photography;
computing an update for the gain to provide an updated gain that is usable to scale the one or more regions-of-interest toward a target mean-luminance value; and
setting the initialized gain for the near-infrared camera system to the updated gain for a next face-authentication attempt.

2. The method of claim 1, further comprising:
subsequent to setting the initialized gain of the near-infrared camera system to the updated gain, receiving an indication from a facial recognition module to update the gain again; and
responsive to the indication, repeating the ascertaining, the computing, and the setting to update the updated gain to a new dampened update.

3. The method of claim 1, wherein the ascertaining includes computing the patch-mean statistics of the one or more regions-of-interest, the one or more regions-of-interest comprising less than the entire image.

4. The method of claim 1, wherein the ascertaining includes receiving the patch-mean statistics from one or more sensors, the received patch-mean statistics constrained to the one or more regions-of-interest.

5. The method of claim 1, wherein patch-mean statistics of the lower-middle region are used to stabilize patch-mean statistics of the center region.

6. The method of claim 1, wherein the patch-mean statistics include mean-luminance values corresponding to the one or more regions-of-interest.

7. The method of claim 1, further comprising:
prior to ascertaining the patch-mean statistics of the one or more regions-of-interest, detecting location information corresponding to a face of a user in the most-recently captured image; and
selecting the one or more regions-of-interest from a plurality of regions of the most-recently captured image based on the location information corresponding to the face of the user.

8. The method of claim 1, further comprising dampening the update in the initialized gain using hysteresis prior to setting the initialized gain to the updated gain for the next face-authentication attempt.

9. The method of claim 1, wherein setting the initialized gain comprises setting one or more resistors of an analog gain sensor of the near-infrared camera system.

10. A method for adaptive gain control in a near-infrared camera system for face authentication on a user device, the method comprising:
in response to initiation of a camera driver system, initializing a gain for the near-infrared camera system using a default gain;
receiving, from one or more sensors, a signal indicating an orientation of the user device;
based on the orientation of the user device, selecting particular regions of a plurality of regions of a most-recently captured image, which was captured by the near-infrared camera system, to use as one or more regions-of-interest for the adaptive gain control;
ascertaining patch-mean statistics of the one or more regions-of-interest of the image;
computing an update for the gain to provide an updated gain that is usable to scale the one or more regions-of-interest toward a target mean-luminance value; and
setting the initialized gain for the near-infrared camera system to the updated gain for a next face-authentication attempt.

11. The method of claim 10, wherein the one or more sensors include one or more of an accelerometer, an inertial measuring unit, or a gyro sensor.

12. The method of claim 1, further comprising:
receiving, from a face detector implemented in hardware, an indication of one or more regions of a plurality of regions that include the face of the user; and
selecting the indicated one or more regions as the one or more regions-of-interest to use for the adaptive gain control.

13. The method of claim 1, further comprising maintaining a fixed exposure time during the adaptive gain control.

14. A computing system comprising:
a near-infrared camera system for capturing image data of a user for face authentication;
a camera driver system configured to drive the near-infrared camera system;
a processor; and
computer-readable instructions which, when executed by the processor, cause the computing system to:
initialize, in response to initiation of the camera driver system, a gain for the near-infrared camera system using a default gain;
ascertain patch-mean statistics of one or more regions-of-interest of a most-recently captured image captured by the near-infrared camera system, the one or more regions-of-interest including a center region and a lower-middle region according to the Rule of Thirds in photography;
compute an update for the gain to provide an updated gain that is usable to scale the one or more regions-of-interest toward a target mean-luminance value; and
set the initialized gain for the near-infrared camera system to the updated gain for a next face-authentication attempt.

15. The computing system of claim 14, wherein the instructions, when executed by the processor, cause the computing system further to:

subsequent to the initialized gain of the near-infrared camera system being set to the updated gain, receive an indication from a facial recognition module to update the gain again; and responsive to the indication:
re-ascertain the patch-mean statistics of the one or more regions-of-interest of the most-recently captured image;
compute a new update for the gain to provide a new dampened update; and
set the updated gain to the new dampened update.

16. The computing system of claim 14, wherein: patch-mean statistics of the lower-middle region are used to stabilize patch-mean statistics of the center region.

17. The computing system of claim 14, wherein the patch-mean statistics include mean-luminance values corresponding to the one or more regions-of-interest.

18. The computing system of claim 14, further comprising one or more sensors configured to detect an orientation of the computing system, and wherein the processor is further configured to, based on the detected orientation of the computing system, select particular regions of a plurality of regions of the image to use as the one or more regions-of-interest for the adaptive gain control.

19. The computing system of claim 18, wherein the one or more sensors include one or more of an accelerometer, an inertial measuring unit, or a gyro sensor.

20. The method of claim 10, wherein:
the one or more regions-of-interest include a center region and a lower-middle region; and
the method further comprises using patch-mean statistics of the lower-middle region to stabilize patch-mean statistics of the center region.

* * * * *